(12) United States Patent
Moyle et al.

(10) Patent No.: US 12,023,961 B2
(45) Date of Patent: Jul. 2, 2024

(54) MATERIAL WITH ENHANCED SLIDING FRICTION

(71) Applicants: Nichole Moyle, Allentown, PA (US);
Florian Bremond, Peschadoires (FR);
Chung Yuen Hui, Ithaca, NY (US);
Haibin Wu, Ithaca, NY (US); Anand Jagota, Bethlehem, PA (US);
Constantine Khripin, Simpsonville, SC (US)

(72) Inventors: Nichole Moyle, Allentown, PA (US);
Florian Bremond, Peschadoires (FR);
Chung Yuen Hui, Ithaca, NY (US);
Haibin Wu, Ithaca, NY (US); Anand Jagota, Bethlehem, PA (US);
Constantine Khripin, Simpsonville, SC (US)

(73) Assignees: COMPAGNIE GENERALE DES ETABLISSEMENTS MICHELIN, Clermont-Ferrand (FR); LEHIGH UNIVERSITY, Bethlehem, PA (US); CORNELL UNIVERSITY, Ithaca, NY (US)

(*) Notice: Subject to any disclaimer, the term of this patent is extended or adjusted under 35 U.S.C. 154(b) by 372 days.

(21) Appl. No.: 17/333,794

(22) Filed: May 28, 2021

(65) Prior Publication Data
US 2021/0283955 A1    Sep. 16, 2021

Related U.S. Application Data

(63) Continuation of application No. PCT/US2019/063609, filed on Nov. 27, 2019.

(Continued)

(51) Int. Cl.
*B60C 11/00*    (2006.01)

(52) U.S. Cl.
CPC ...... *B60C 11/0008* (2013.01); *B60C 11/0058* (2013.01); *B60C 2011/0025* (2013.01)

(58) Field of Classification Search
CPC .................. B60C 11/0008; B60C 11/0058
(Continued)

(56) References Cited

U.S. PATENT DOCUMENTS

| | | | |
|---|---|---|---|
| 2013/0028555 A1* | 1/2013 | Dailey | G01D 5/35316 385/12 |
| 2018/0170112 A1 | 6/2018 | Sakata | |
| 2018/0370288 A1* | 12/2018 | Araujo Da Silva | B60C 11/0008 |

FOREIGN PATENT DOCUMENTS

| | | |
|---|---|---|
| EP | 0408941 | 1/1991 |
| JP | S61166710 | 7/1986 |

(Continued)

OTHER PUBLICATIONS

International Preliminary Report on Patentability mailed May 25, 2021, in International Appplication No. PCT/US2019/0636309.

(Continued)

*Primary Examiner* — Tahseen Khan
(74) *Attorney, Agent, or Firm* — FisherBroyles LLP

(57) ABSTRACT

An article of manufacture comprising: (a) a body at least a portion of which is a multi-phase material (MPM) defining a traction surface; (b) the MPM comprising at least first and second zones comprising first and second materials, M1, M2, respectively, at or near the traction surface, the M1 and M2 having first and second Young moduli respectively, the first and second moduli differing by at least a factor of 3; and (c) wherein each of the second zones has a center, and wherein the second zones have a center-to-center radial distribution function having a peak at between 10 μm and 10 mm.

22 Claims, 15 Drawing Sheets

Related U.S. Application Data

(60) Provisional application No. 62/774,191, filed on Dec. 1, 2018, provisional application No. 62/774,081, filed on Nov. 30, 2018.

(58) Field of Classification Search
 USPC .......................................................... 428/212
 See application file for complete search history.

(56) References Cited

FOREIGN PATENT DOCUMENTS

| JP | H01190503 | 7/1989 | | |
|---|---|---|---|---|
| JP | 2012153272 | 8/2012 | | |
| WO | 2015016388 | 2/2015 | | |
| WO | 2017109339 | 6/2017 | | |
| WO | WO-2017109339 A1 * | 6/2017 | ........... | B60C 1/0016 |

OTHER PUBLICATIONS

International Search Report mailed Feb. 19, 2020, in International Appplication No. PCT/US2019/0636309.

Written Opinion of the International Searching Authority mailed Feb. 19, 2020, in International Appplication No. PCT/US2019/0636309.

Anonymous: "Elastohydrodynamic Lubrication," Jun. 17, 2015, XP055665856, Retrieved from the Internet: URL:http://www.wp-industrial.co.uk/Elastohydrodynamic_Lubrication.html {retrieved on Feb. 6, 2020].

Communication under Rule 71(3) mailed Mar. 29, 2023, in European Application No. 19 828 934.0.

\* cited by examiner

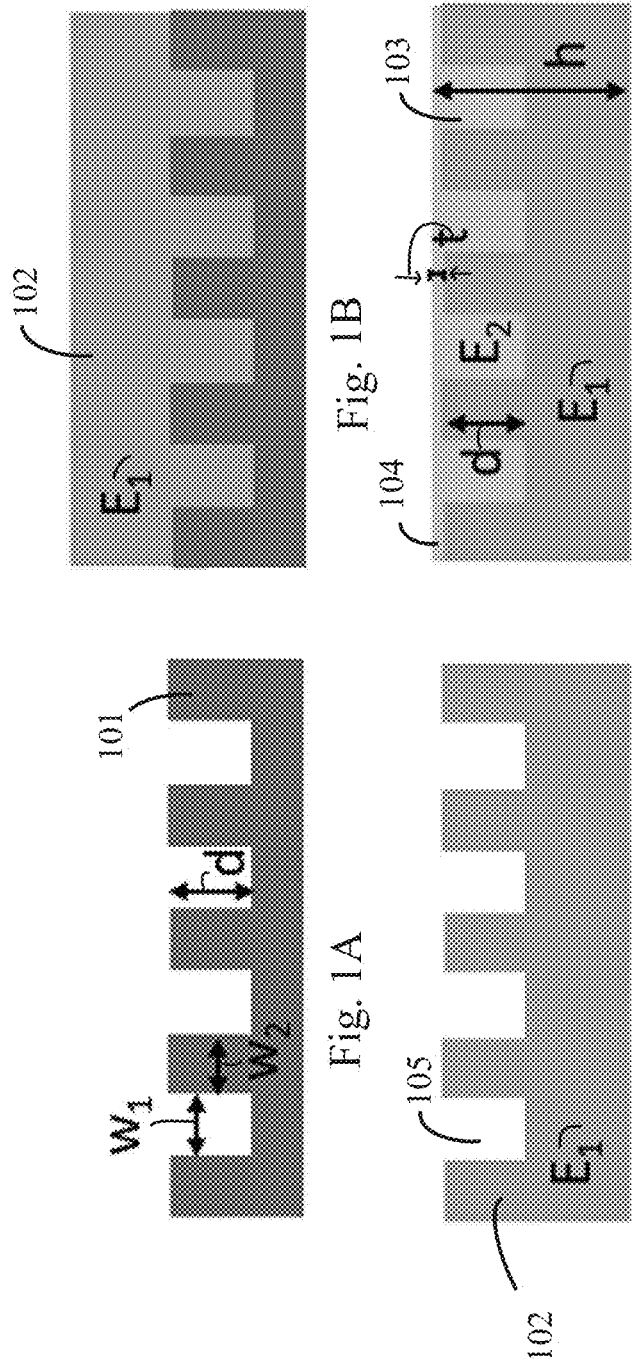

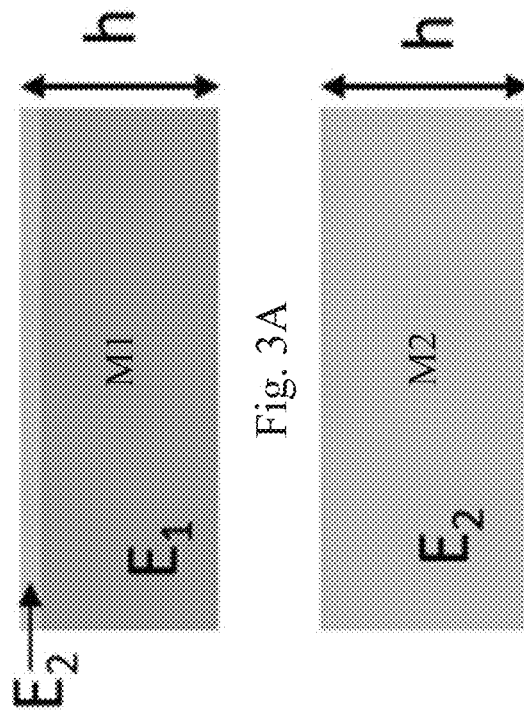
Fig. 3A
Fig. 3B
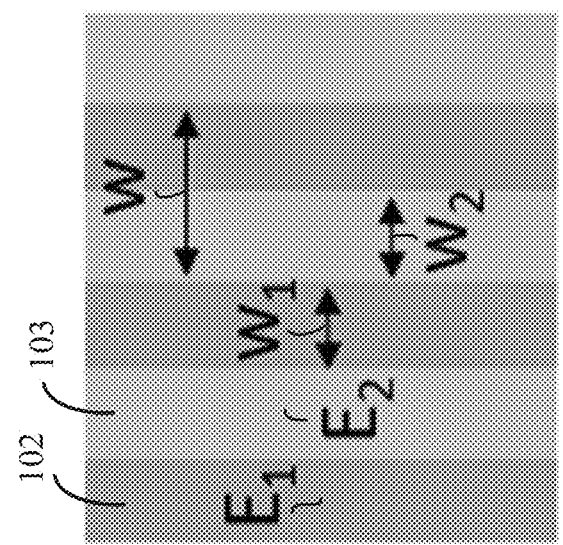
Fig. 2

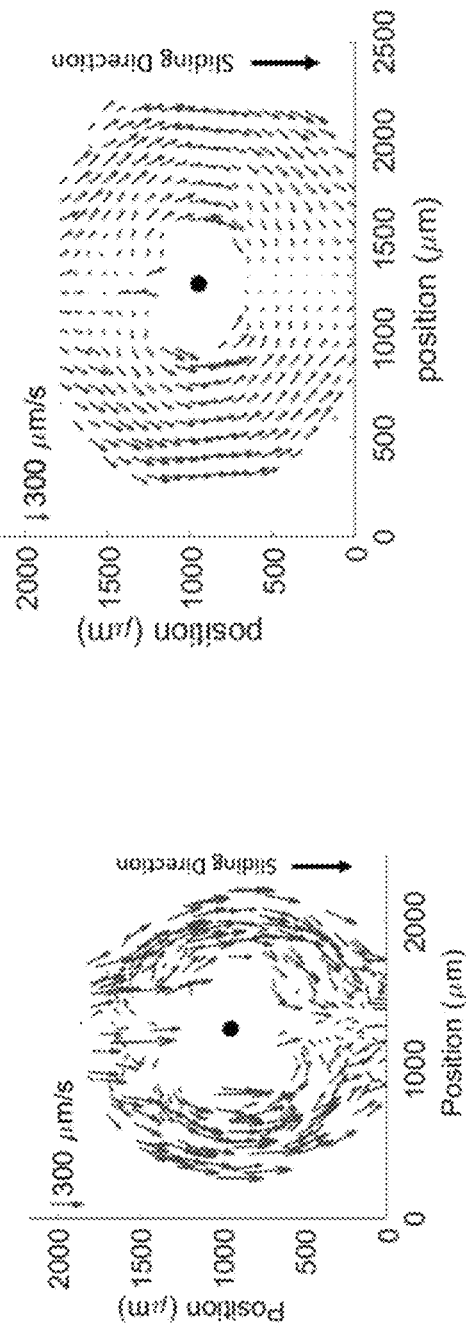
Fig. 9A
Fig. 9B
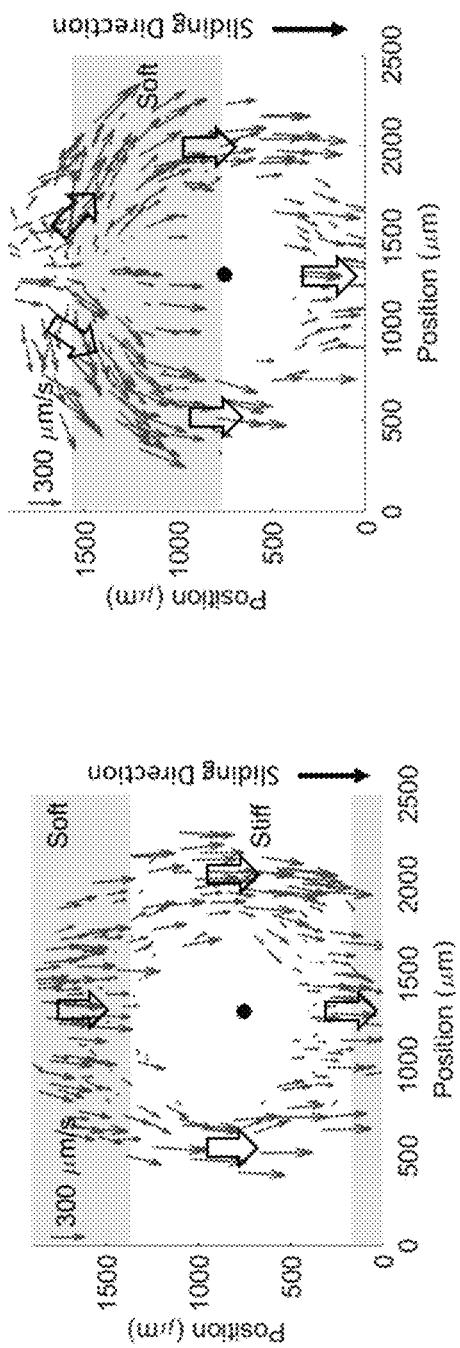
Fig. 10A
Fig. 10B

MATERIAL WITH ENHANCED SLIDING FRICTION

REFERENCE TO RELATED APPLICATION

This application is a continuation of International Application No. PCT/US2019/063609, filed Nov. 27, 2019, which is based on U.S. provisional application No. 62/774,081, filed Nov. 30, 2018, and U.S. provisional application No. 62/774,191, filed Dec. 1, 2018, all of which are hereby incorporated by reference in their entirety.

STATEMENT REGARDING FEDERALLY SPONSORED RESEARCH OR DEVELOPMENT

This invention was made with government support under 1538002 awarded by the National Science Foundation. The government has certain rights in the invention.

FIELD OF INVENTION

The invention relates, generally, to a material having enhanced friction, and, more specifically, to an elastic material exhibiting enhanced sliding friction in the elastohydrodynamic lubrication (EHL) regime.

BACKGROUND

The behavior of lubricated compliant contacts is important in many technological and natural settings such as between tires and a road surface, synovial joints, and contacting surfaces of animals that live in a wet environment. Of particular interest herein is enhancing sliding friction in the elastohydrodynamic lubrication (EHL) regime where hysteretic or adhesive effects are typically absent. Furthermore, friction is generally low in the EHL regime and thus configurations to enhance it are highly desirable in various applications, such as tires. Therefore, there is a need for enhancing sliding friction in the EHL regime. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicants discovered that. when a traction surface having zones of different moduli is slid across an indenter, it exhibits enhanced sliding friction under elastohydrodynamic lubrication (EHL) conditions. Normally, one would expect the friction produced by a surface comprising two materials of different moduli to be simply the weighted average of the frictions of the two materials. However, Applicants observed that the friction is significantly greater. Without being tied to any particular theory, Applicants believe that this synergistic increase in sliding friction is the result of the lubricant absorbing energy as the lubricant is drawn in and pushed out of the recess created by the indenter as the indenter slides across the traction surface. More specifically, the sudden local transition in compliance between the zones provides a mechanism for unstable deformation and dissipation of energy—i.e., a new form of Elastic Hysteresis. In other words, the energy lost through the process of indentation of the surface as the modulus changes across the surface is a major mechanism behind the friction enhancement. Moreover, based on the observation described herein of sudden rapid and periodic radial fluid flow in the contact region of the indenter, it appears that this energy is being dissipated through the lubricating fluid.

In one embodiment, the present invention relates to an article of manufacture comprising: (a) a body at least a portion of which is a multi-phase material (MPM) defining a traction surface; (b) MPM comprising at least first and second zones comprising first and second materials, M1, M2, respectively, at or near the traction surface, M1 and M2 having first and second Young moduli respectively, the first and second moduli differing by at least a factor of 3; and (c) wherein each of the second zones has a center, and wherein the second zones have a center-to-center radial distribution function having a peak at between 1 μm and 10 mm.

In another embodiment, the present invention relates to a method of preparing a multi-phase material (MPM) having a traction surface, the method comprising: (a) combining at least a first material M1 with a second material M2 to form at least first and second zones, respectively, at or near the traction surface, M1 and M2 having first and second Young moduli respectively, the first and second moduli differing by at least a factor of 3; and (b) wherein each of the second zones has a center, and wherein the second zones have a center-to-center radial distribution function having a peak at between 1 μm and 10 mm.

In yet another embodiment, the present invention relates to a method of using a body comprising a multiphase material (MPM) having a traction surface in the elastohydrodynamic lubrication (EHL) regime, the method comprising: (a) sliding the traction surface at a velocity on a lubricated surface under EHL conditions, MPM comprising at least first and second zones comprising first and second materials, M1, M2 respectively, at or near the traction surface, M1 and M2 having first and second Young moduli respectively, the first and second moduli differing by at least a factor of 3, and wherein each of the second zones has a center, and wherein the second zones have a center-to-center radial distribution function having a peak at between 1 μm and 10 mm; and (b) wherein the EHL conditions comprise at least a normalized velocity V of $10^{-8}$ to $10^{-4}$ wherein $V = U\eta R^{5/3} G^{1/3} N^{-4/3}$ wherein, R is median asperity radius of the wet surface, N is the normal load on the traction surface, η is the viscosity of a lubricant on the lubricated surface, U is the velocity, and G is $G_{ave} = xG_{M1} + yG_{M2}$, wherein x and y represent the fraction of surface area of the traction surface occupied by M1 and M2, respectively, and the $G_{M1}$ and $G_{M2}$ represent the first and second moduli, respectively.

BRIEF DESCRIPTION OF FIGURES

FIGS. 1A-1D show schematics of a side view of molding procedure used for casting multi-phase structure (MPM).

FIG. 2 shows a schematic of a top view of multi-phase material (MPM) under film layer.

FIGS. 3A and 3B show schematics of control structures.

FIG. 9A shows a frame from video of analyzed particle trajectories.

FIG. 9B shows a time-averaged velocity profile.

FIGS. 10A-10E show particle tracking results for MPM. The black dots represent the lowest point of the indenter, sliding direction is of the sample relative to the indenter.

DETAILED DESCRIPTION

Figure 4:
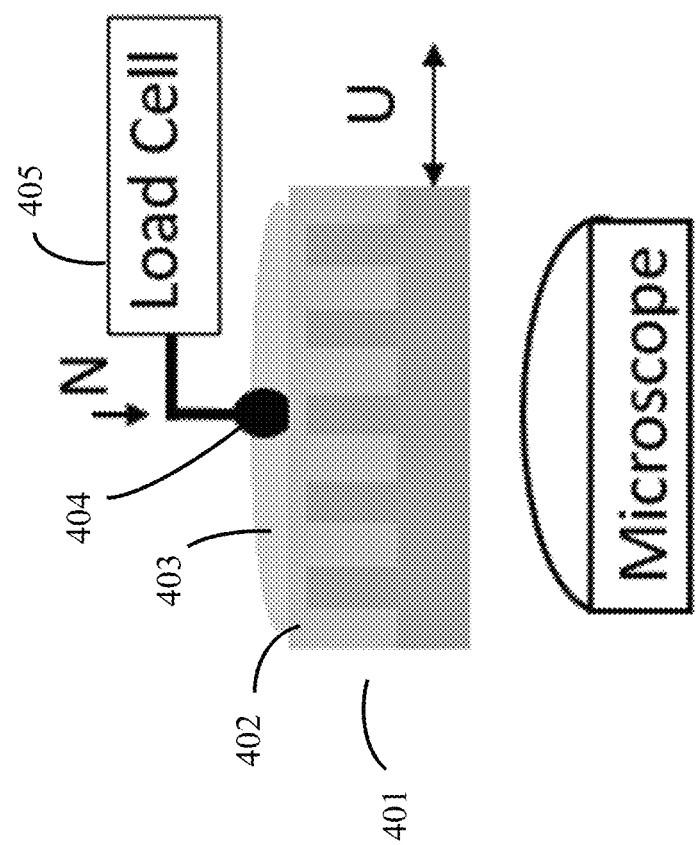
FIG. 4 shows a schematic of the lubricated sliding experiment.

In one embodiment, the present invention relates to an article of material comprising: (a) a body at least a portion of which is a multi-phase material (MPM) defining a traction surface; (b) MPM comprising at least first and second zones comprising first and second materials, M1, M2, respectively, at or near the traction surface, M1 and M2 having first and second Young moduli respectively, the first and second moduli differing by at least a factor of 3; and (c) wherein each of the second zones has a center, and wherein the second zones have a center-to-center radial distribution function having a peak at between 1 µm and 10 mm.

As is explained in greater detail below in connection with Example 1, Applicants have discovered that an elastic material having zones of varying moduli exhibits a synergistic increase in sliding friction in the EHL regime relative to elastic materials having a uniform moduli. More specifically, in the embodiment wherein MPM comprises just two different materials, M1, M2, and wherein x and y represent the fraction of surface area of the traction surface occupied by M1 and M2, respectively, and wherein each of MPM, M1, and M2 has a sliding friction force, $f_{MPM}$, $f_{M1}$, $f_{M2}$ (as determined by the Sliding Friction Test and calculated using the sliding friction force equation (III) detailed in Example 1, the sliding frictions correlate to an enhancement ratio, Enh.R, as follows:

$$Enh.R. = \frac{f_{MPM}}{x * f_{M1} + y * f_{M2}} \quad (I)$$

Applicants have found that Enh.R is greater than 1, and, in some embodiments, greater than 1.5, and, in some embodiments, greater than 2, and, in some embodiments, greater than 2.5, and, in some embodiments, even greater than 3. This is a significant and unexpected result. That is, one of skill in the art would expect Enh.R to be about 1—i.e. one would expect the sliding friction of MPM to equal the weighted average of the sliding friction of its components M1 and M2. This however is not the case.

Without being tied to any particular theory, Applicants believe that this synergistic increase in sliding friction is the result of the lubricant in the EHL realm absorbing energy as the lubricant is drawn in and pushed out of the recess created by the indenter as the indenter slides across the traction surface. More specifically, as described in greater detail below in Example 1, the sudden local transition in compliance between the zones of different moduli provides a mechanism for unstable deformation and dissipation of energy—i.e., a new form of Elastic Hysteresis. In other words, the energy lost through the process of indentation of the surface as the modulus changes across the surface is a major mechanism behind the friction enhancement. Moreover, based on the observation described herein of sudden rapid and periodic radial fluid flow in the contact region of the indenter, it appears that this energy is being dissipated through the lubricating fluid.

Before going into detail of selected embodiments of the invention, it is worthwhile to understand certain terminology. As used herein, the terms indent and asperity are used interchangeably unless otherwise noted. Generally, although not necessarily, the term indent is used in the context of experiments in which the indenter creates the indent. The term asperity is generally, although not necessarily, used in the context of real-world applications in which the elastic body contacts surfaces having a roughness defined by asperity size. Regardless, the interchangeable use of the terms asperity and indent/indenter should not in any way be interpreted to limit the claims.

In order to quantify the spacing of the first and second materials (and perhaps others), the spacing is defined as a center-to-center radial distribution function. This is defined as the density of particle centers as a function of distance from any typical particle. It can be defined in 1, 2, or 3 dimensions. In the following examples, Applicants show how this works in 1D, and the extension to 2D or 3D is straightforward.

Figure 12A:
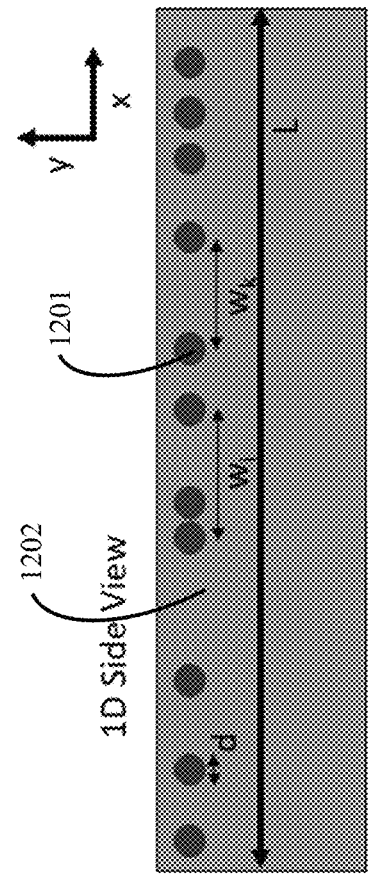
FIGS. 12A and 12B show side and top schematics, respectively, for 1D model of cylinders embedded in a bulk material.
Figure 12B:
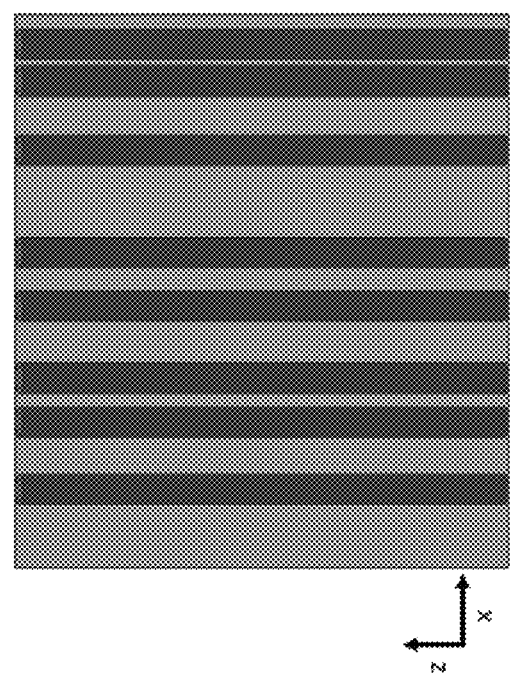
Figure 13:
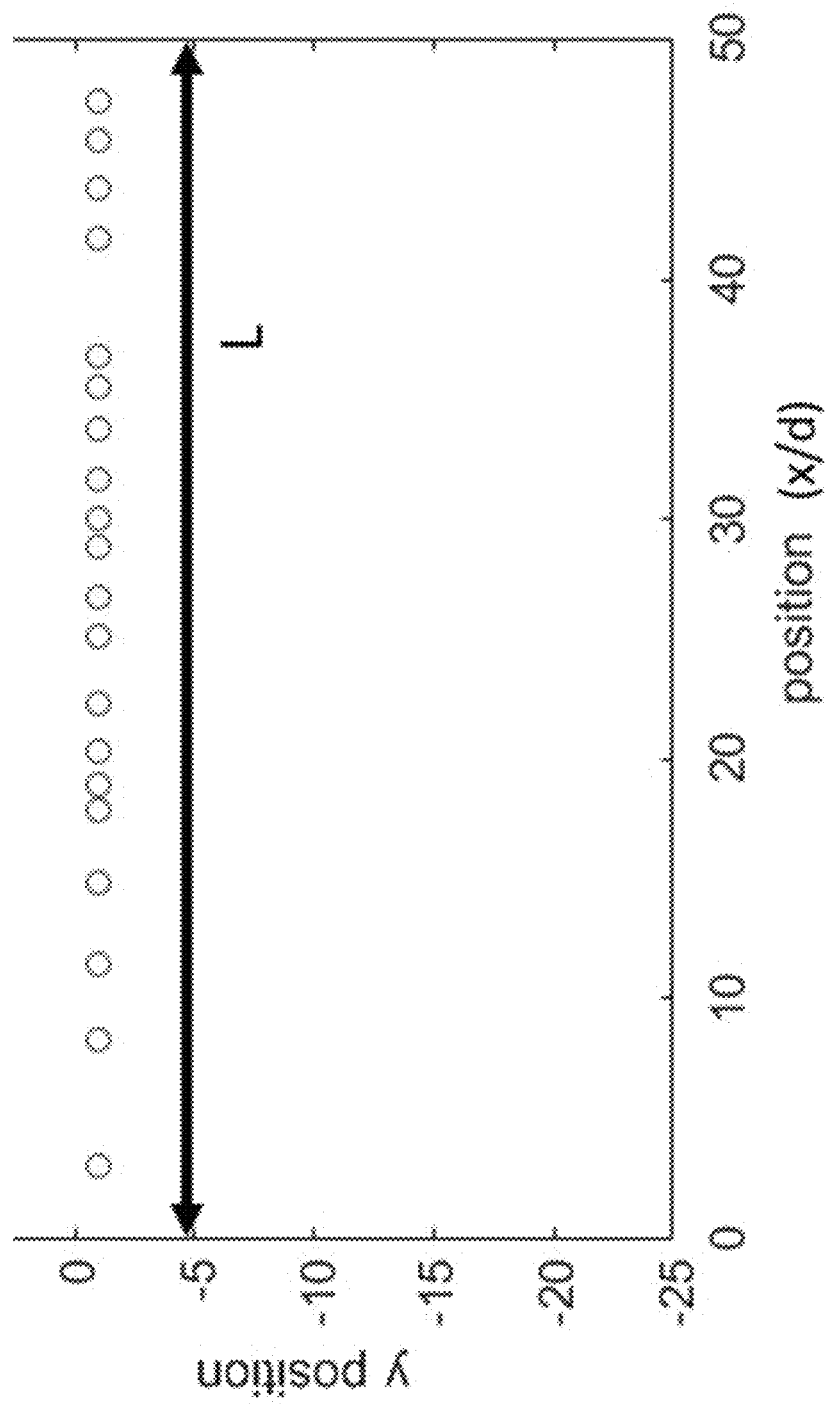
FIG. 13 is 1D model output for 2D cylinders being randomly placed into a bulk of L=50d

A 1D model for cylinders embedded in a bulk matrix material was developed. Schematics of the model are shown in FIG. 12. The model begins with a set length of the bulk matrix material, L, cylinder diameter, d, and number of cylinders, n. Cylinders are randomly assigned an x position from zero to L while the y position is kept fixed. A constraint that cylinders could not overlap was applied. An example of the model output for n=20 cylinders being randomly placed into a bulk of L=50d with d=1 is shown in FIG. 13.

Figure 14:
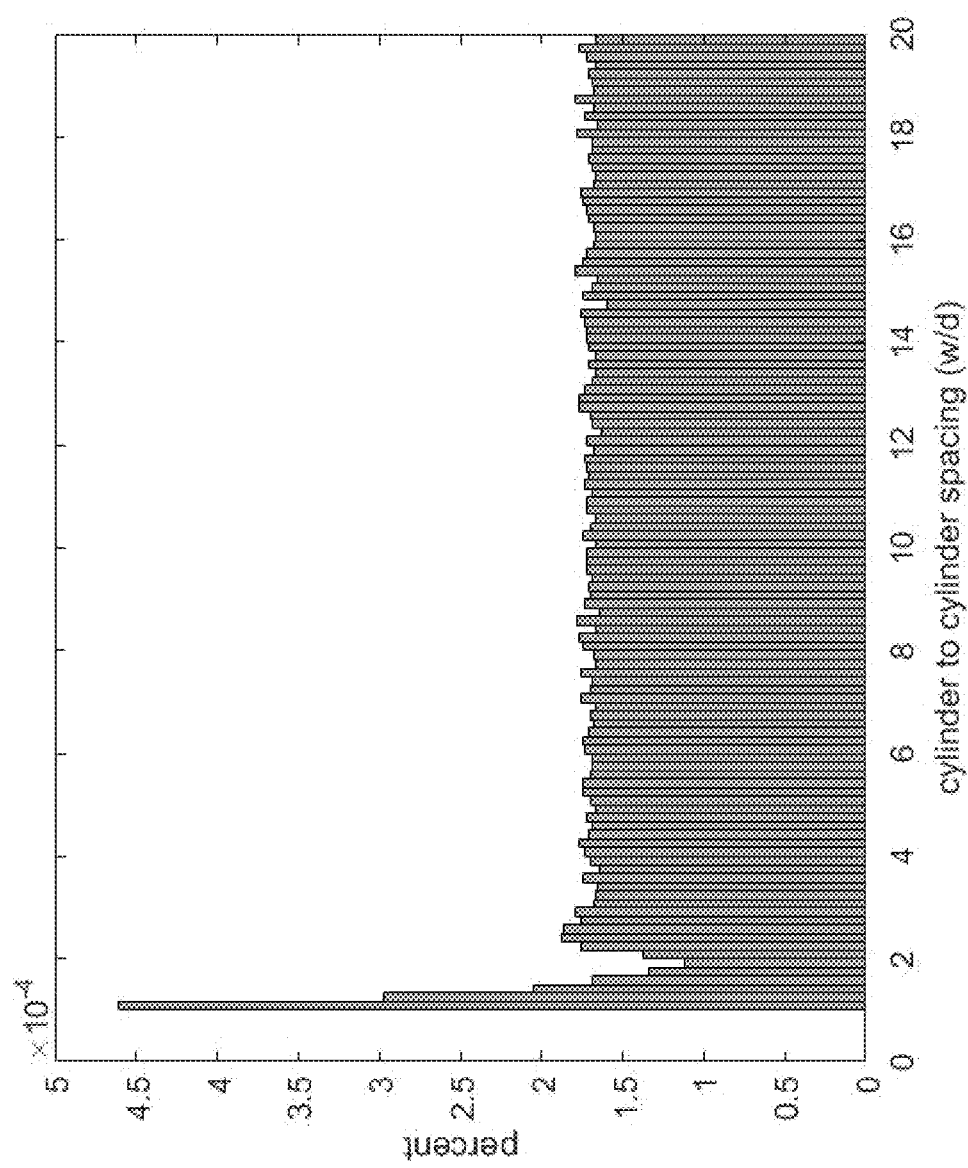
FIG. 14 is a histogram for case run with L=20,000d d=1, and n=14,329.
Figure 15:
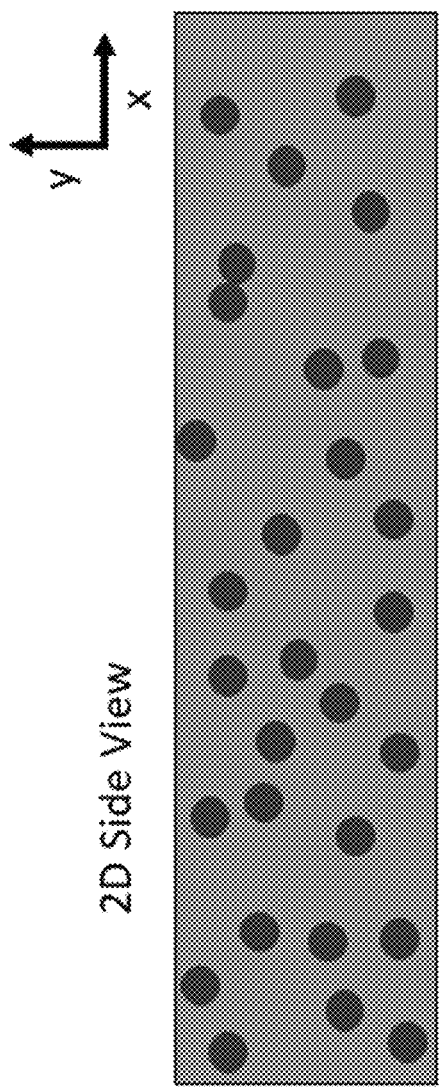
FIG. 15 is a schematic for 2D model of cylinder embedded in a bulk material.

A larger simulation of this process was run with L=20,000d and d=1, with 200,000 attempts to place a cylinder randomly in L without overlapping with a previously positioned cylinder. This results in a high/maximum loading of cylinders for a random assortment (for the case shown, n=14,329 cylinders). FIG. 14 shows a histogram of the resulting center-to-center cylinder distances, which were calculated for all cylinders, not just nearest neighbors. There is a peak at the spacing equal to the cylinder diameter, 1, then a sharp decrease which levels off at a spacing of approximately 3. Results obtained for a 2D geometry, as is shown in FIG. 15, would have a similar profile to the 1D results, but here the distribution would be in both x and y.

Conceptually his model could also be extended to particles in a bulk material, in both 1D and 2D.

The 1D peak in FIG. 14 occurs at x=d based on the nature of the model, i.e., that of a "hard wall" repulsion at center-to-center distance of d. If Applicants re-interpret d as different from the diameter, say D, then physically this peak can represent any convenient inter-particle characteristic distance. Having this peak occur at the periodic spacing which is expected to give an enhancement to the relevant indenter diameter would allow for the optimal operating conditions for this type of random geometry.

When discussing the fraction of surface area of the traction surface that is occupied by different materials, it should be understood that this determination is based upon a mechanical determination and not necessarily material determination. More specifically, in some embodiments, it may be preferable to overlay the traction surface of MPM with a thin layer of material. That thin layer of material, however, does not materially affect the modulus of the traction surface. Therefore, when referring to the surface area of the traction surface occupied by a certain material of a certain modulus, the surface area will correspond to the zone on the traction surface exhibiting that certain modulus, and not the composition of the thin film which may overlay the zone but not appreciably affect the modulus at the surface.

Having defined some of the terminology associated with this disclosure, selected embodiments of the invention are described below in detail.

As mentioned above, an important aspect of the invention is the distribution of zones having different moduli on the traction surface. The spacing between zones, the moduli of the zones, the configuration of the zones, the zone materials, and the proportion of the different zone materials can vary according to application. One of skill in the art in light of this disclosure will be will understand how to optimize these variables to increase sliding friction of a traction surface in EHL conditions.

Considering first the spacing between zones, Applicants believe there may be a correlation between anticipated indent size and spacing. Without being tied to a particular theory, Applicants believe that configuring the center-to-center radial distribution function of the article such that its peak is approximately the expected diameter of the indent optimizes the performance of the article in EHL conditions. In one embodiment, the peak is between 1 μm and 10 mm, and, in another embodiment, between 5 μm and 1 mm, and, and, in another embodiment, between 10 μm and 1 mm, and, in another embodiment, between 10 μm and 100 μm, and, in a particular embodiment, between 10 μm and 50 μm.

Another feature of the claimed invention is the differential between the Young's moduli of the different materials. As mentioned above, as the indenter moves across the traction surface and encounters zones of different moduli, the sudden local transition in compliance between zones provides a mechanism for unstable deformation and dissipation of energy. In one embodiment, the moduli differ by at least a factor of 3, and, in another embodiment, the moduli differ by at least a factor of 10, and, in another embodiment, the moduli differ by a factor of 10 to 50, and, in another embodiment, the moduli differ by a factor of 20 to 40. Although in the broadest sense the first or second moduli can either be higher or lower than the other, in one embodiment, the second modulus is greater than the first modulus, although, it should be understood that, within the claims, the first modulus may be greater than the second modulus. Furthermore, it should be understood that the invention is not limited to two different materials of different moduli being used. Rather, additional materials—having Young's moduli differing from the first and second moduli—may be interposed among the first and second zones.

In one embodiment, the modulus of the first material is about 1 kPa to about 100 MPa, and, in a more particular embodiment, about 100 kPa to about 10 MPa, and, in the even more particular embodiment, about 1 MPa to about 10 MPa. In one embodiment, the modulus of the second material is about 300 Pa to about 30 MPa, and, in a more particular embodiment, about 1 kPa to about 5 MPa, and, in the even more particular embodiment, about 100 kPa to about 1 MPa.

Figure 11A:
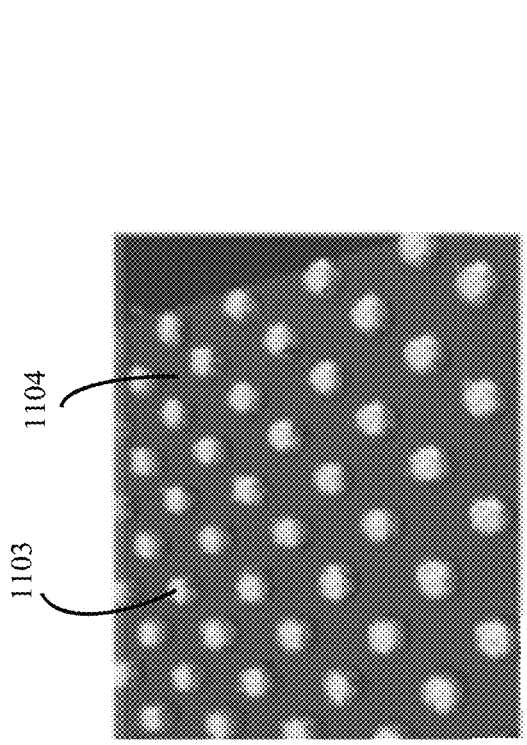
FIG. 11A-11B shows alternative configurations for the different zones in MPM.
Figure 11B:
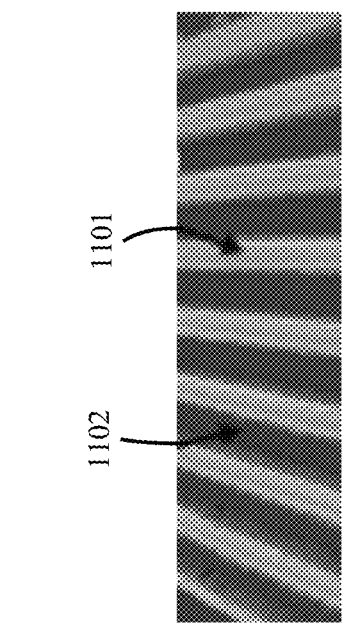

Another aspect of the invention is that the zones may take on different forms, for example, they may be orderly rows, columns, and other patterns, or they may be randomized to some degree with one material being dispersed within another material in an island-like fashion. In one embodiment, the materials are configured as alternating rows. For example, referring to FIG. 11A, the zones 1101, 1102 are configured as alternate rows. These rows may have essentially the same width, or they may have different widths. In another embodiment, the first zones are disposed as islands within a matrix of the second material. For example, referring to FIG. 11B the zones are configured with islands of one zone 1103 interspersed in a matrix of another zone 1104. This particular embodiment may be formed by mixing crumbs of the first material into a fluid volume of the second material. In another embodiment, the second zones are disposed as islands within a matrix of the first material. This particular embodiment may be formed by mixing crumbs of the second material into a fluid volume of the first material. In yet another embodiment, the first and second zones are an amalgamation of zones of the first and second materials. In yet another embodiment, rods of one material 1201 may be dispersed randomly within a matrix 1202 as shown in FIG. 12A. Accordingly, it should be understood that many different embodiments of varying the first and second zones are within the scope of the invention.

As indicated above, various materials having different moduli may be used in the present invention. In one embodiment, the first material has a relatively high modulus, and comprises, for example, at least one of silica or carbon black filled elastomer such as natural rubber (NR), styrene butadiene rubber (SBR), polybutadiene rubber (BR), isoprene rubber (IR) or silicone rubber; elastomer with a high vulcanization rate; elastomer with thermoset resin such as resol or novolac; elastomer with highly rigidifying filler such as graphene, aramid or cellulose or other short fibers, or carbon nanotubes. Besides elastomers, possible materials include thermoplastic elastomers (TPE) or thermoplastic polyurethane (TPU) material, especially with a high proportion of hard phase; crumb rubber; cellulose or aramide short fiber. In one embodiment, the second material has a relatively low modulus, and comprises, for example at least one of elastomers such as NR, BR, IR, or SBR with a low level of vulcanization, with a high level of plasticizer such as oil or thermoplastic resin, elastomer with coarse or non-reinforcing fillers such as N990 grade carbon black or spherical silica, elastomer with a foaming agent to generate a foam. Besides elastomers, TPE or TPU with a low proportion of hard phase, brush polymers, and similar materials may be used For other applications, for example in human health such as for contact lens, artificial cartilage, etc., candidate materials include the family of hydrogels and organogels with different moduli. Specific examples of M1 and/or M2 include, poly(ethylene glycol) PEG based hydrogels, Gelatin, Gellan Gum, poly(vinyl alcohol), poly(methyl methacrylate) (PMMA), hydrogel of poly (2-hydroxyethyl methacrylate) (PHEMA), and biodegradable polymers such as polycaprolactone (PCL), poly(lactic acid) (PLA), poly(lactic-co-glycolic acid (PLGA), and poly-4-hydroxybutyrate (P4HB).

The proportions of the first and second materials may vary. As described above, one measurement of the relative concentrations of the first and second materials is the fraction of the surface area they occupy on the traction surface, x and y, respectively. In one embodiment, x is greater than y, in another embodiment, x is about the same as y, and yet in another embodiment, y is greater than x. In one embodiment, x and y are between 0.05 and 0.95, in a more particular embodiment, between 0.1 and 0.9, and, in a more particular embodiment, between 0.2 and 0.8, and, in a more particular embodiment, between 0.40 and 0.6. In one particular embodiment, x is about 0.6 and y is about 0.4.

The claimed article of manufacture described herein may be any article, component, device, or system in which an elastic traction surface slides over an indenter/asperity in the ELM regime. For example, the article of manufacture may be a tire, a prosthesis, footwear, gloves, apparel. In one embodiment, the article comprises a traction surface which is a surface configured to slide over an indenter/asperity. The configuration of the traction surface may vary according to the application. For example, it can be a relatively planar surface in two dimensions (e.g., a shoe sole), a surface that is planar in one dimension and curved in another dimension (e.g. a tire tread), or, curved in both dimensions (e.g., a socket of an artificial joint).

Those of skill in the art will recognize that there are different methods of preparing the multi-phase material (MPM) of the present invention. In one embodiment, the method comprises combining at least a first material M1 with a second material M2 to form at least first and second zones, respectively, at or near the traction surface, M1 and M2 having first and second Young moduli respectively, the first and second moduli differing by at least a factor of 3. In one embodiment, the materials are combined such that each of the second zones has a center, and wherein the second zones have a center-to-center radial distribution function having a peak at between 1 μm and 10 mm.

There are various ways for combining the different zone materials. For example, referring to FIGS. 1C and 1D, in one embodiment, a structure comprising the first material 102 is formed which defines cavities 105 therein, and then the cavities are filled with the second material 103. To this end, a mold 101 may be used to mold the structure as shown in FIGS. 1A and 1B. It should be understood that the cavities may be grooves, caps, random patterns, or any other voids which can be filled by the second material. Generally, although not necessarily, the structure is formed with a material having a higher modulus than the other material such that it provides greater rigidity.

Alternatively, rather than molding a structure, combining the materials may comprise one embodiment, mixing crumbs of one of the first or second materials into a fluid volume (e.g., green rubber) of the other of the first or second materials. In one embodiment, the crumbs comprise the second material and the fluid volume comprises the first material, and, in an alternative embodiment, the crumbs comprise the first material and the fluid volume comprises the second material.

Another aspect of the present invention is using and article comprising an MPM material in the EHL regime. In one embodiment, the method comprises sliding a traction surface of MPM at a velocity on a lubricated surface under EHL conditions. The lubricated surface is characterized by asperities. The MPM comprises at least first and second zones comprising first and second materials, M1, M2, respectively, at or near the traction surface, M1 and M2 having first and second Young moduli respectively, the first and second moduli differing by at least a factor of 3, and wherein each of the second zones has a center, and wherein the second zones have a center-to-center radial distribution function having a peak at between 1 μm and 10 mm.

In one embodiment, the EHL conditions are qualified using a normalized velocity V of $10^{-4}$ to $10^{-8}$. Normalized velocity is defined as:

$$V = U\eta R^{5/3} G^{1/3} N^{-4/3} \tag{II}$$

where,
R is median asperity radius of said lubricated surface,
N is the normal load on said traction surface,
η is the viscosity of a lubricant on said lubricated surface,
U is said velocity, and
G is $G_{ave} = xG_{M1} + yG_{M2}$, wherein x and y represent the fraction of surface area of said traction surface occupied by said M1 and M2, respectively, and said $G_{M1}$ and $G_{M2}$ represent the first and second moduli, respectively.

The concept and definition of normalized velocity as described in detail below in connection with Example 1.

In one embodiment, the body is a tire and the lubricated surface is a wet road, and thus, the lubricant is water. In one embodiment, the tire is mounted to a wheel of a vehicle, and sliding is caused by at least one of turning the wheel or braking the wheel. In one particular embodiment, the EHL regime is hydroplaning.

It is interesting to note that the normalized velocities in Example 1, which were confirmed to be within the EHL realm, correspond closely with the expected normalized velocities calculated based upon typical hydroplaning conditions. More specifically, as seen in the plots in FIGS. 8A and 8B described in Example 1, the normalized velocities, V, tested experimentally range from about V=$10^{-4}$-$10^{-7}$. Table 1 below shows estimates for V for typical tire/road conditions, and similar magnitudes of values are obtained

TABLE 1

Normalized velocity values, V, for typical tire conditions using a tire pressure of $10^6$ N/m$^2$, a viscosity of 1cP (the viscosity of water), and a tire rubber shear modulus, G, of $10^6$ N/m$^2$.

| Normalized Velocity (V) | | | Indenter Radius (m) | | | | |
|---|---|---|---|---|---|---|---|
| Velocity, m/s | 1.0E−06 | 3.2E−06 | 1.0E−05 | 3.2E−05 | 1.0E−04 | 3.2E−04 | 1.0E−03 |
| 0.10 | 2.2E−05 | 6.9E−06 | 2.2E−06 | 6.9E−07 | 2.2E−07 | 6.9E−08 | 2.2E−08 |
| 0.14 | 3.1E−05 | 9.9E−06 | 3.1E−06 | 9.9E−07 | 3.1E−07 | 9.9E−08 | 3.1E−08 |
| 0.21 | 4.5E−05 | 1.4E−05 | 4.5E−06 | 1.4E−06 | 4.5E−07 | 1.4E−07 | 4.5E−08 |
| 0.30 | 6.5E−05 | 2.1E−05 | 6.5E−06 | 2.1E−06 | 6.5E−07 | 2.1E−07 | 6.5E−08 |

TABLE 1-continued

Normalized velocity values, V, for typical tire conditions using a tire pressure of $10^6$ N/m$^2$, a viscosity of 1cP (the viscosity of water), and a tire rubber shear modulus, G, of $10^6$ N/m$^2$.

| Normalized Velocity (V) | Indenter Radius (m) | | | | | | |
|---|---|---|---|---|---|---|---|
| Velocity, m/s | 1.0E−06 | 3.2E−06 | 1.0E−05 | 3.2E−05 | 1.0E−04 | 3.2E−04 | 1.0E−03 |
| 0.43 | 9.3E−05 | 3.0E−05 | 9.3E−06 | 3.0E−06 | 9.3E−07 | 3.0E−07 | 9.3E−08 |
| 0.62 | 1.3E−04 | 4.3E−05 | 1.3E−05 | 4.3E−06 | 1.3E−06 | 4.3E−07 | 1.3E−07 |
| 0.89 | 1.9E−04 | 6.1E−05 | 1.9E−05 | 6.1E−06 | 1.9E−06 | 6.1E−07 | 1.9E−07 |
| 1.28 | 2.8E−04 | 8.8E−05 | 2.8E−05 | 8.8E−06 | 2.8E−06 | 8.8E−07 | 2.8E−07 |
| 1.85 | 4.0E−04 | 1.3E−04 | 4.0E−05 | 1.3E−05 | 4.0E−06 | 1.3E−06 | 4.0E−07 |
| 2.66 | 5.8E−04 | 1.8E−04 | 5.8E−05 | 1.8E−05 | 5.8E−06 | 1.8E−06 | 5.8E−07 |
| 3.19 | 6.9E−04 | 2.2E−04 | 6.9E−05 | 2.2E−05 | 6.9E−06 | 2.2E−06 | 6.9E−07 |

Therefore, the experimental results of Example 1 are applicable to wet road conditions.

The following example is a study and analysis of the phenomena behind the invention. It should be understood that this is for explanatory purposes and should not be construed, in any way, to limit the scope the invention.

Example 1

Sample Preparation

Samples were made from poly(dimethylsiloxane) (PDMS, Dow Sylgard 184, Dow Corning). The molding process for fabrication of multi-phase material (MPM) samples is shown schematically in FIG. 1A-1D. A mold 101 was machined out of aluminum with a ridge channel geometry, as is shown in FIG. 1A. Mold channel width, $w_1$, was 1.2 mm, ridge width, $w_2$, was 0.8 mm, and ridge height, d, was 1 mm. The stiff portion of the structure was fabricated by casting a first material M1 102 (i.e., a 10:1 base to cross linker mixture of PDMS) 102 into the mold as is shown in FIG. 1B. M1 was cured on the mold at 80° C. for 2 hours, then brought to room temperature and removed from the mold as shown in FIG. 1C. Next a second material M2 103 (i.e., a 30:1 base to cross linker mixture of PDMS) was poured into the cured M1 102 to form the soft portion of the structure as is shown in FIG. 1D. The structure was cured again at 80° for 2 hours with a weighted glass slide on top of the 30:1 mixture, resulting in only a thin layer 104 of M2 covering the surface of the sample, making the entire surface chemically homogeneous.

The final dimensions for the MPM samples are labeled in FIG. 1D (side view) and FIG. 2 (top view, under thin film layer) and are as follows; structure height, d, of 1 mm, thin film thickness, t, of approximately 70 microns, total sample height, h, of 2 mm, stiff phase width, $w_1$, of 1.2 mm, soft phase width, $w_2$, of 0.8 mm, and structure period, w of 2 mm.

The Young's modulus of M1 is denoted by $E_1$ and is approximately 3 MPa, while the Young's modulus of M2 is denoted by $E_2$ and is approximately 190 kPa. Two controls were fabricated to test friction properties of the two phases, and are shown schematically in FIG. 3. The M1 sample is shown in the bottom of FIG. 3, and is a 2 mm thick slab of 30:1 base to cross linker mixture of PDMS, cured at 80° C. for two hours. The M2 sample is shown in the top of FIG. 3, and was fabricated by first making a 2 mm thick slab of 10:1 base to cross linker mixture of PDMS, cured at 80° C. for two hours. Then, in a procedure similar to the MPM fabrication, a layer of 30:1 base to cross linker PDMS mixture was poured onto the cured control sample and cured at 80° C. for two hours while under a weighted slide, resulting in a thin layer of M2 coating the top of the sample.

Measuring Friction

Sliding friction in a direction orthogonal to the stripes was measured under lubricated conditions. A schematic of the sliding experiment is shown in FIG. 4. The surface 402 of the sample 401 was coated with a layer 403 (approximately 1 mm thick) of a highly wetting lubricant (PDMS base, viscosity 1=5.1 Pa*s). A spherical glass indenter 404 (R=0.5, 2 mm, or 3 mm) was brought into contact with the sample surface under a normal load ranging from 18.6 to 238.1 mN and the sample was moved perpendicular to the applied load using a variable speed motor (Newport ESP MFA-CC) with velocities ranging from 0.025 to 1 mm/s. The indenter was connected to a load cell 405 (Honeywell Precision Miniature Load Cell) measuring the friction force resisting sample motion.

The Slide Friction Test to determine sliding friction force according to Equation (III) below is as follows:

Coat surface of material to be tested with PDMS base, viscosity η=5.1 Pa*s.

Contact surface with a spherical glass indenter 404 (as shown in FIG. 4) with a R=2 mm under a normal load of 100 mN. The indenter is connected to a load cell 405 (as shown in FIG. 4)

Move sample perpendicular to the applied load at a velocity of 0.1 mm/s and measure load.

Data was recorded for a full cycle of lubricated sliding, where a sample would be brought away from and then back to its starting position. Sample displacements for the controls were chosen based on how long it took for the force to reach steady state. For the multi-phase material sample a displacement of 10 mm in each direction was always used in order to probe 5 full structure periods.

To visualize motion during sliding, a small subgroup of experiments were performed with fluorescent particles mixed into the lubricant (Cospheric FMR-1.3, diameters of 1-5 m). Videos were analyzed using the particle tracking software TrackMate in the Fiji distribution of ImageJ. All reported friction values are for clean lubricant with no particles to avoid their potential influence on measured friction. Experiments to assure that swelling from the lubricant was minimal for the length and time scales being probed during the experiment were performed, and showed no effect from swelling.

Results

Figure 5:
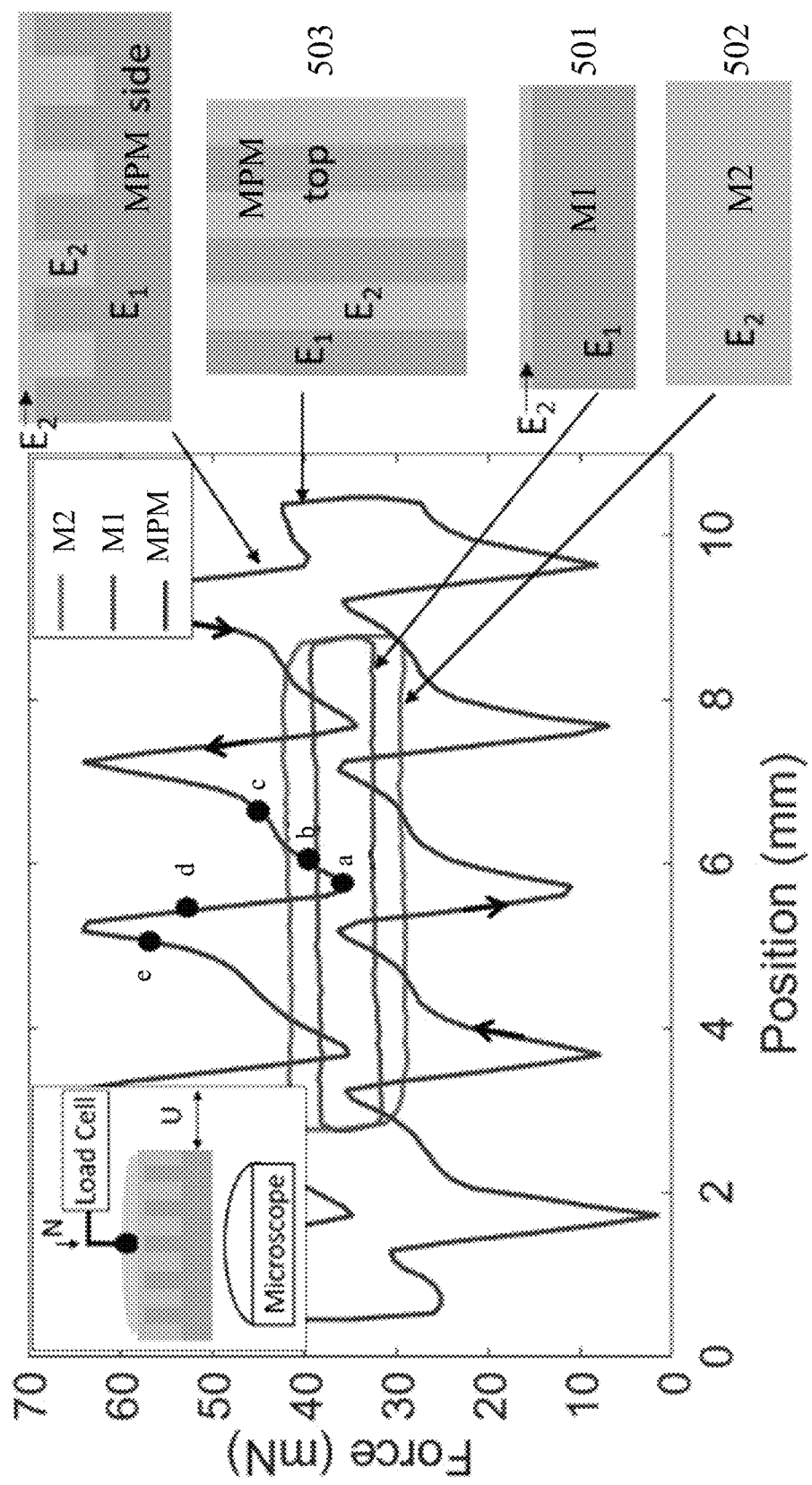
FIG. 5 shows typical raw data for one cycle of the multi-phase material (MPM) (black line), large modulus control (M1) (blue line), and the small modulus control (M2) (orange line). Black markers labeled a-e correspond to images in FIG. 10A-10E.

Friction was first measured against a 2 mm radius spherical glass indenter for 72 different load and velocity combinations, with unreacted PDMS base used as the lubricant. FIG. 5 shows typical data obtained for one cycle of the lubricated sliding experiments. It is evident that the measured friction behavior of the two flat controls 501, 502 is markedly different from that of the MPM sample 503. As would be expected, both flat controls have a relatively constant friction force as the samples undergo cyclic lubricated sliding against the indenter. For the multi-phase material sample, however, frictional force varies periodically as the sample is moved relative to the indenter, with a maximal or minimal friction force every 2 mm, the period of the sample surface structure.

Sliding friction force, f, was calculated from the data in FIG. 5 using the equation $$f = \oint P du/\delta \quad \text{(III)}$$

where P is the measured horizontal force, u is the sample displacement and δ is the total distance the sample travels during a cycle. (The integral on the RHS of eq. (III) is the energy loss in a cycle.) Applying equation (III) to an entire cycle could produce an error as samples exhibited startup effects when changing direction. To avoid these effects, for the controls f was calculated only on portions of the curve on which force had reached steady state. For the structured sample, each cycle contained 5 periods (10 mm displacement in each direction) and equation (1) was applied to a 4 mm section in the center of the cycle, sampling 2 complete periods. This avoided startup effects as well as any biasing of the data that could occur by measuring an incomplete period.

Figure 6:
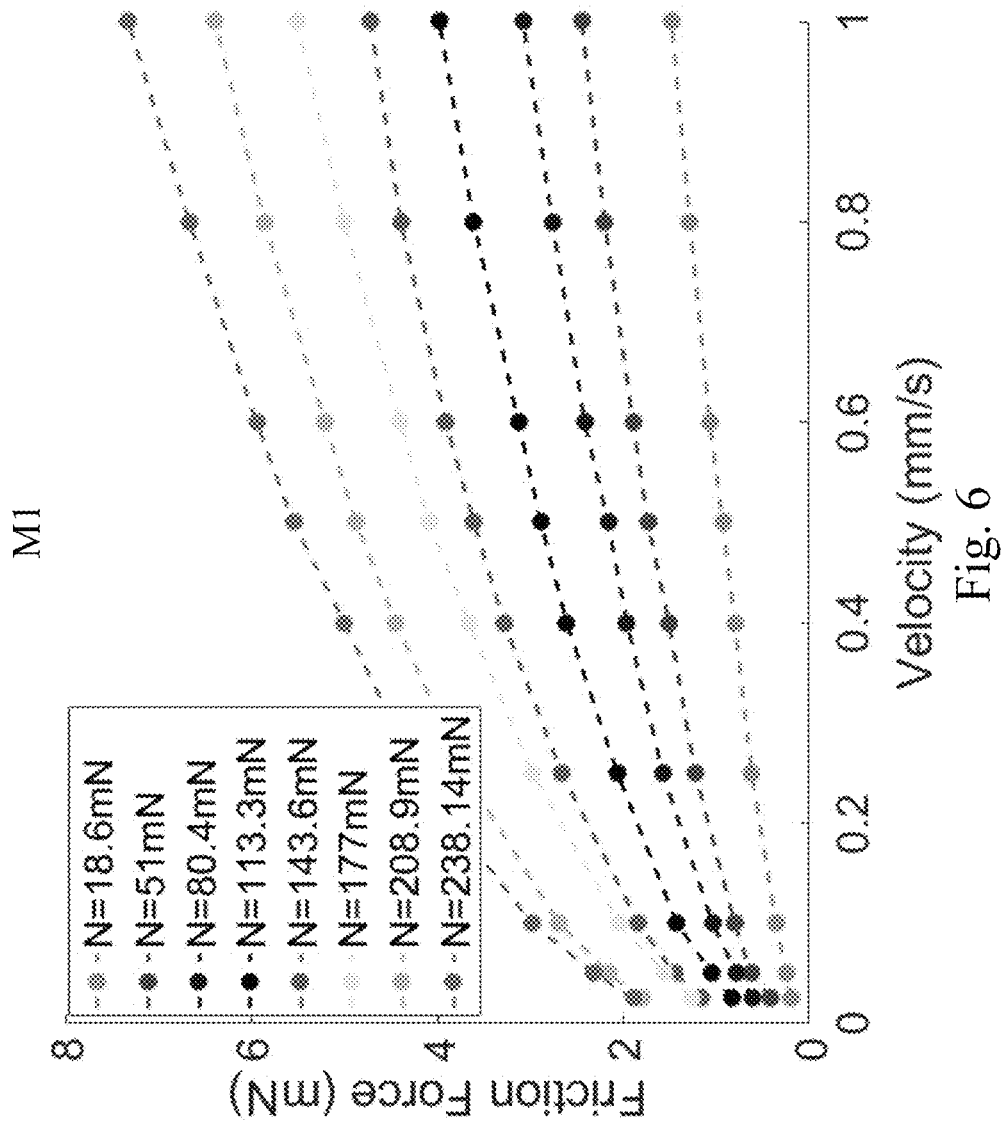
FIG. 6 shows a plot of friction force, f, for a range of velocity and load conditions for the large modulus control (M1).
Figure 7B:
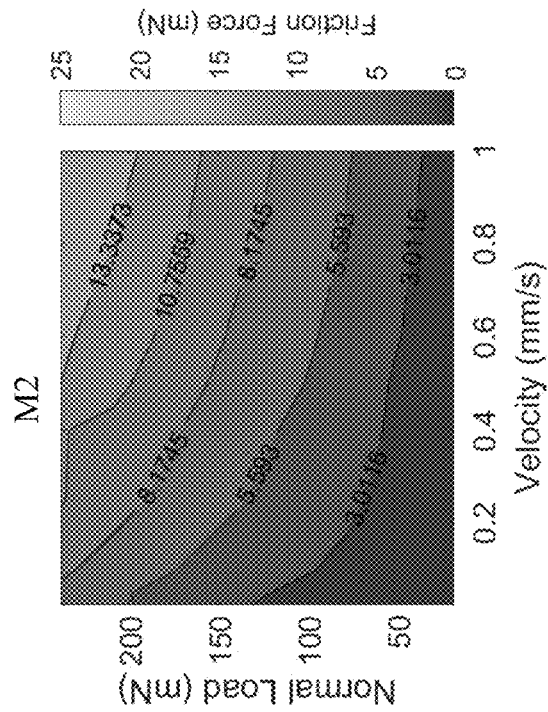
FIGS. 7A-7C show contour plots of friction values for (a) M1 (b) M2, and (c) MPM in load-velocity space.
Figure 7A:
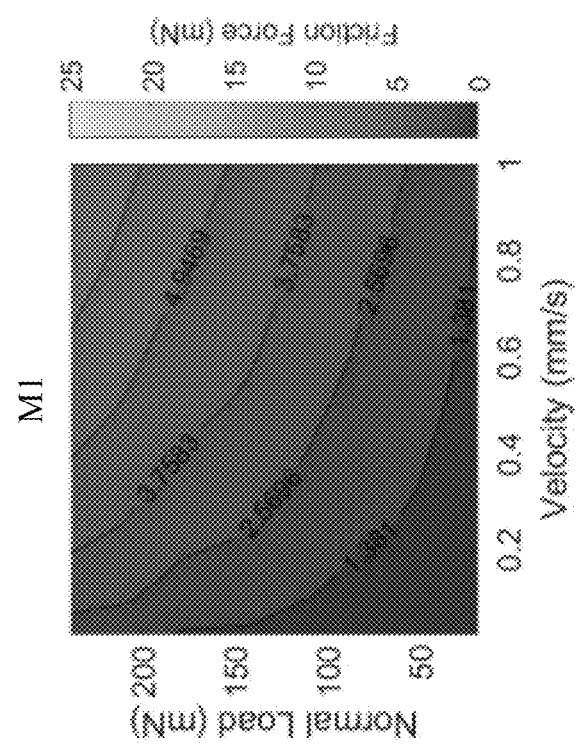
Figure 7C:
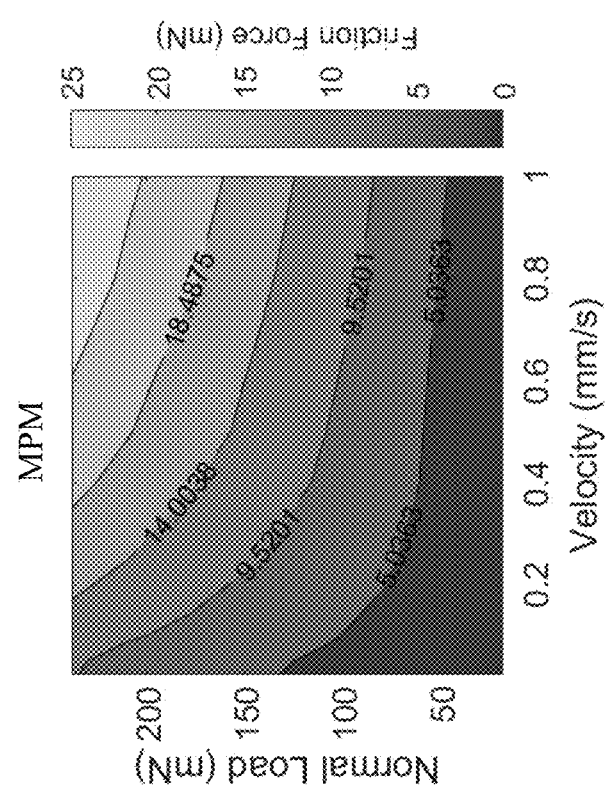

FIG. 6 shows a plot containing friction forces of M1 for all load and velocity conditions tested. This plot shows that the largest friction values are obtained at the largest load and velocity conditions. The effect of velocity and load on the lubricated friction can also be visualized using a contour plot in load-velocity space. FIG. 7A shows this plot for the data shown in FIG. 6, while the equivalent data for M2 and MPM are shown as contour plots in FIGS. 7B and 7C, respectively. Comparing the three contour plots, it is clear that the velocity and load dependence of all three samples is similar for the parameter space tested. However, one striking difference between the three contour plots is the magnitude of the friction forces measured. At high load and velocity conditions, M1 has friction is about 7 mN (FIG. 7A) while for M2 it is about 15 mN (FIG. 7B). Because MPM presents chemically a uniform surface and mechanically a surface that is in nearly equal parts M2 and M1, one might expect friction for MPM to be bounded by that of M2 and M1. However, contrary to this expectation, Applicants measure friction for MPM to be about 27 mN for large velocity and normal load. That is, the MPM sample has significantly higher friction at a given set of conditions than both controls.

To better quantify this increase in lubricated sliding friction exhibited by MPM a friction enhancement ratio, Enh.R. (I) as described above was calculated as follows:

$$Enh.R. = \frac{f_{MSM}}{0.6 * f_{M1} + 0.4 * f_{M2}}$$

where $f_{MPM}$, $f_{M1}$, and $f_{M2}$ are the friction values for MPM, M1, and M2 respectively, and 0.4 and 0.6 represent the fraction of the surface area occupied by each phase.

Table 2 shows enhancement ratios for velocities of 0.025, 0.5, and 1 mm/s. Inspection of Table 2 shows a friction enhancement ratio of 2 or higher for most of the conditions tested with the 2 mm radius indenter, with a maximum value of 3.0 for a velocity of 0.025 mm/s and a load of 80.4 mN. Thus, it is clear MPM provides significant lubricated friction enhancement (up to a factor of 3) over load and velocity ranges that span more than an order of magnitude for a spherical indenter with a diameter equal to the period of the structure.

TABLE 2

Friction enhancement ratios for MPM under lubricated sliding against 2 mm and 0.5 mm radius indenters.

| | R = 2 mm | | | | | | R = 0.5 mm | |
|---|---|---|---|---|---|---|---|---|
| | 0.025 mm/s | | 0.5 mm/s | | 1 mm/s | | 0.5 mm/s | |
| load (mN) | Enh. R. | Error | Enh. R | Error | Enh. R. | Error | Enh. R. | Error |
| 18.6 | 1.9 | 0.1 | 1.75 | 0.05 | 1.69 | 0.04 | 1.7 | 0.3 |
| 51.0 | 2.76 | 0.05 | 2.3 | 0.1 | 2.1 | 0.1 | 1.4 | 0.1 |
| 80.4 | 3.0 | 0.2 | 2.32 | 0.04 | 2.15 | 0.02 | 1.24 | 0.05 |
| 113.3 | 2.9 | 0.1 | 2.37 | 0.02 | 2.30 | 0.02 | 1.19 | 0.03 |
| 143.6 | 2.7 | 0.1 | 2.48 | 0.01 | 2.6 | 0.1 | 1.09 | 0.02 |
| 177.0 | 2.6 | 0.1 | 2.55 | 0.04 | 2.51 | 0.02 | 0.95 | 0.01 |
| 208.9 | 2.2 | 0.1 | 2.49 | 0.03 | 2.47 | 0.03 | 1.0 | 0.2 |
| 238.1 | 2.2 | 0.1 | 2.48 | 0.02 | 2.55 | 0.02 | 1.20 | 0.02 |

Qualification of EHL Regime

To understand the mechanisms contributing to the observed friction enhancement of MPM it is critical to know in which lubrication regime the experiments are operating. Based on the magnitude of the sliding friction values, the compliance of the substrate, as well as the lack of dry contact observable during experiments it was hypothesized that experiments are in the EHL regime. To confirm this a scaling analysis was performed. EHL theory shows that for a lubricated rigid sphere sliding steadily against the flat surface of a homogenous elastic substrate, the response depends on a single dimensionless parameter, normalized velocity, V, given by Equation (II) above, which is repeated below:

$$V = U \eta R^{5/3} G^{1/3} N^{-4/3}$$

where R is the sphere radius, G is the shear modulus of the substrate, N is the normal load, η is the (constant) viscosity of the lubricant, and U is the sliding velocity, as shown schematically in FIG. 3A. The value of G is well-defined for M2 and M1, whereas for MPM Applicants used a value, $G_{ave}$, given by $G_{ave} = xG_{M1} + yG_{M2}$, where x and y are the fractions of surface area of the traction surface occupied by M1 and M2, respectively as mentioned above. In this example, x is 0.6 and y is 0.4.

The normalized friction force F is determined according to the following equation:

$$F = fR^{2/3}G^{1/3}N^{-4/3} = F(V) \quad \text{(IV)}$$

Figure 8A:
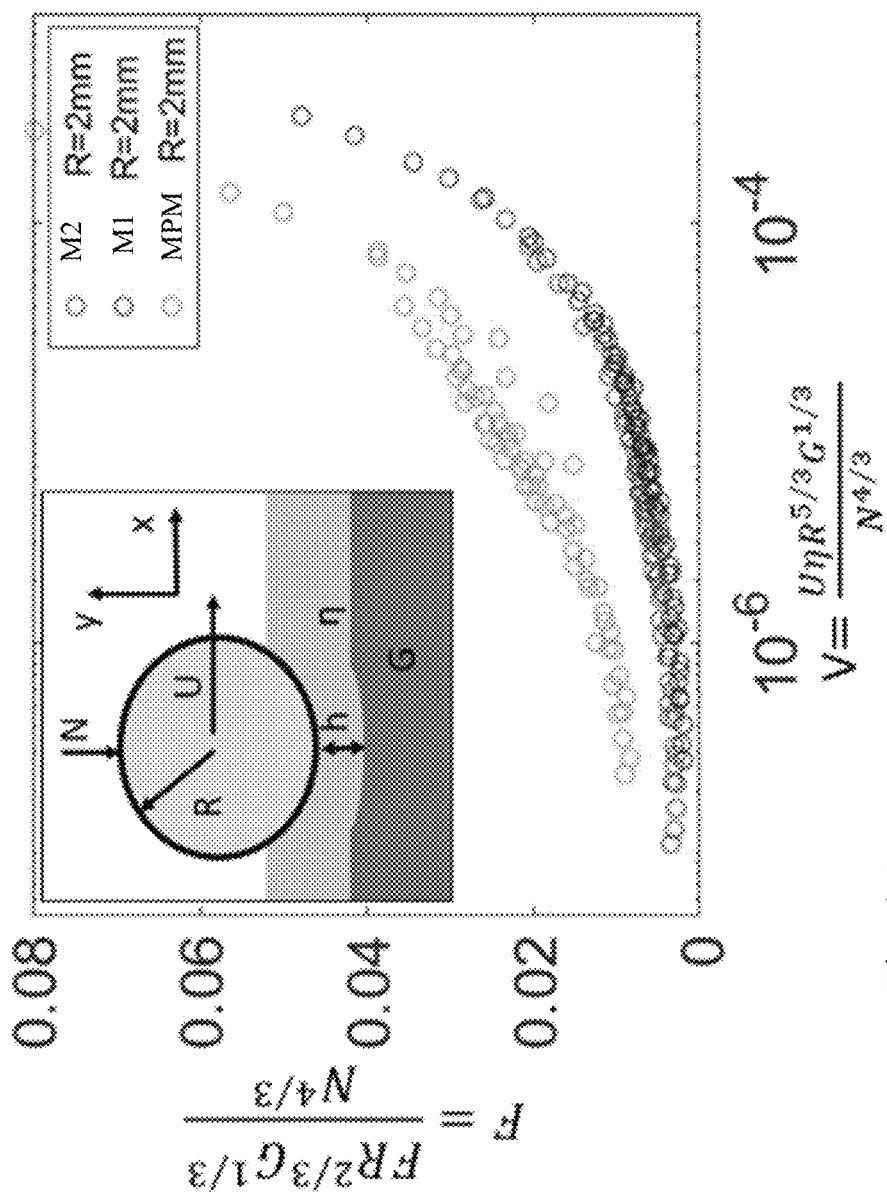
FIG. 8A shows a plot of normalized friction force and normalized velocity for experiments with R=2 mm indenter using EHL theory for scaling.

FIG. 8A plots F versus V for lubricated sliding experiments (R=2 mm indenter). The range of dimensionless velocity, V~$10^4$-$10^7$, in these experiments is similar to that for typical tire conditions. The blue circles in FIG. 8A represent all data points plotted in FIG. 6 (and the equivalent contour plot in FIG. 7A) for M1. Evidently, the EHL scaling collapses the 72 different velocity and load conditions tested with this control onto one master curve. The red circles in FIG. 8A represent the same experimental conditions but for M2, which were first plotted in FIG. 7B. Not only do the M2 experiments also collapse onto one master curve when scaled, they do so onto the same master curve as M1. This result makes it apparent that for these conditions the two controls are under lubricated sliding in the isoviscous EHL regime. The green circles in FIG. 8A represent data for MPM, FIG. 7C. These data also collapse onto a similar master curve albeit somewhat more scattered than for the controls. This likely comes from the fact that the steady-state EHL scaling is based on a homogeneous elastic-half space, and does not account for the periodic variation of substrate properties in MPM. Most significantly, MPM shows considerably higher normalized friction values than the controls at the same normalized velocities, again highlighting the friction enhancement of these structures.

A smaller subset of experiments using indenters with radii of 0.5 mm and 3 mm were tested in a similar load and velocity range as for previous experiments. When tested with a 3 mm radius indenter MPM exhibited similar enhancements to those seen with the 2 mm radius indenter. The same is not true for experiments using the 0.5 mm indenter, which for most load and velocities tested exhibited little or no enhancement for MPM. The results for an intermediate velocity of 0.5 mm/s are listed in Table 2.

Figure 8B:
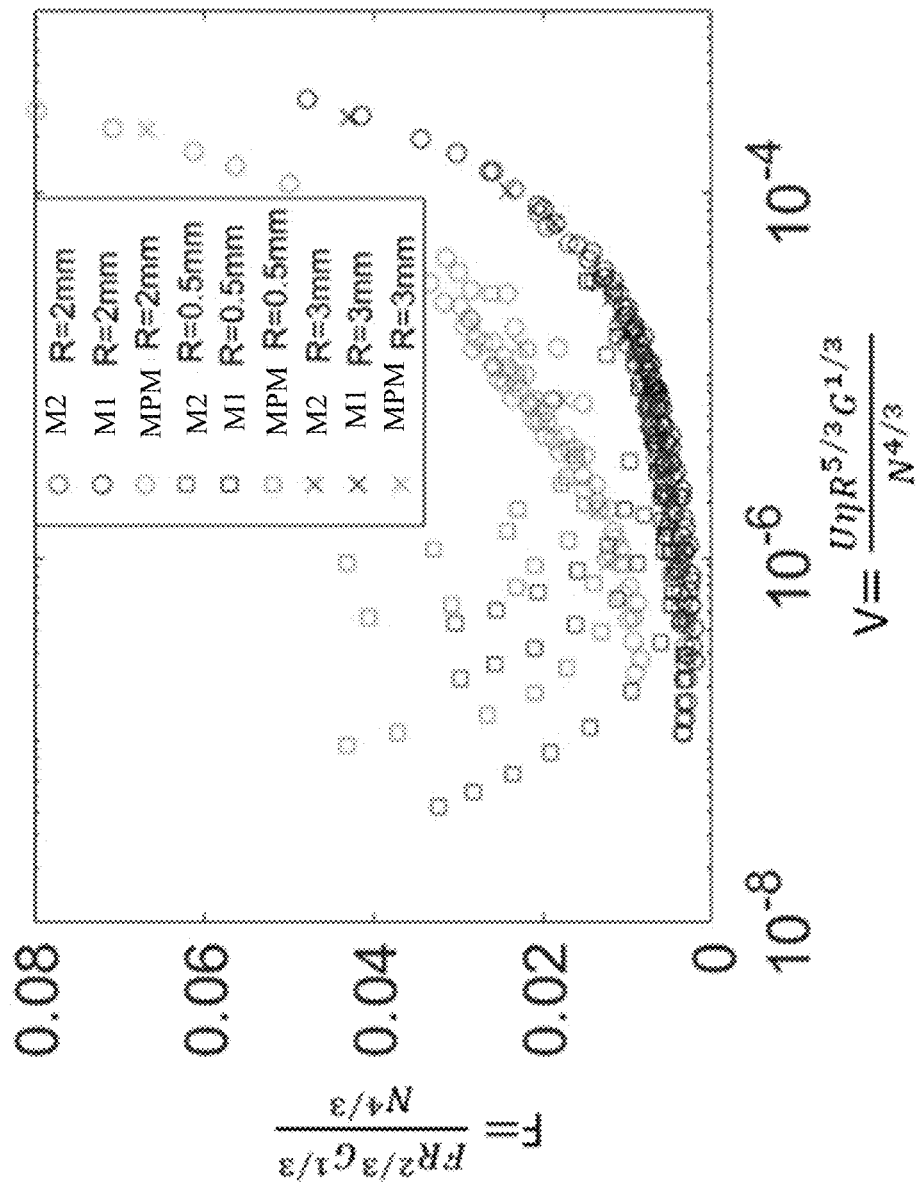
FIG. 8B shows a plot of normalized friction force and normalized velocity for experiments with R=0.5 mm, R=2 mm, and R=3 mm indenters using EHL scaling.

Scaling of these additional data sets, plotted in FIG. 8B along with the data for the 2 mm radius indenter, gives insight into why friction enhancement is lost with the decrease in indenter size. For the 3 mm radius indenter, the controls and the MPM results fall onto the same master curves as the data from the 2 mm radius indenter experiments. In contrast, the scaled results for the 0.5 mm indenter do not all fall on the same master curves as the larger indenter experiments. While the data for M1 collapse onto the same curve as the larger indenters, many of the results for M2 and MPM do not. For these latter samples, at low loads (large V) the data collapsed on the same master curves as the larger indenter experiments, but as load increased (small V) both diverged away from master curves towards larger normalized friction values. This divergence resulted in three separate curves each for M1 and MPM data, one for each velocity tested with the 0.5 mm radius indenter (0.1, 0.5, and 1 mm/s). This indicates that for the 0.5 mm radius indenter Applicants have probed conditions where the sliding contact is no longer operating in the EHL regime, but instead is in the mixed lubrication regime for M1 and MPM samples. This change from EHL lubrication to mixed lubrication resulted in a loss of friction enhancement. For example, at a load and velocity condition of 18.6 mN and 0.5 mm/s, which for the 0.5 mm radius indenter has all three samples collapsing onto the curves of the larger indenters, a friction enhancement ratio of 1.7 was obtained, as listed in Table 2. For the same velocity and indenter diameter, increasing the load to 80.4 mN results in a divergence from the master curve obtained using larger indenters, and a reduced friction enhancement ratio of 1.2 was obtained.

When lubricated sliding friction enhancements are observed in composite materials the enhancements are often attributed to the composite providing additional dissipative contributions from viscoelastic effects in the material (hysteretic friction) and fluid film breakage where dry contact occurs (adhesive friction). However, in our case the data in FIG. 8A collapse using purely isoviscous EHL scaling, so it is unlikely that these mechanisms are contributing to the observed friction enhancement.

To determine the cause of the observed friction enhancement, experiments were performed to visualize the fluid flow during sliding. To this end, Applicants added fluorescent particles to the lubricant fluid. Dark field imaging studies focused on sliding against a 2 mm radius indenter at an intermediate velocity of 0.5 mm/s. Videos of the particle motion were recorded during sliding experiments. Even under the smallest load tested, the videos showed a region devoid of particles near the center of the contact. This indicates an area where the film thickness is less than the diameter of the particles (1-5 microns). That is, this region gives an indication of the effective contact area for a given set of conditions.

Videos were analyzed using particle tracking software (TrackMate®) to obtain streamlines. Particle tracking results were then used to calculate velocity vectors for each particle in each frame of the video, an example of which is shown in FIG. 9A. There is considerable fluctuation in measured velocities, in part because the vertical position of each particle within the fluid is variable. For the cases where sliding occurs with steady state flow (in the frame of the indenter), such as for M2, a time averaged velocity profile can be computed, as shown in FIG. 9B.

Under a variety of load conditions, the velocity fields (in a frame of reference attached to the indenter) for both M2 and M1 exhibited similar stable steady state flow. Qualitatively, the velocity fields are all similar with uniaxial flow far from the contact region, a radial component of the flow field (first outgoing and then incoming) near the "contact" region, and an inner "contact" region devoid of measurements from which marker particles are excluded. The size of this contact region increases with increasing normal load.

Figure 10C:
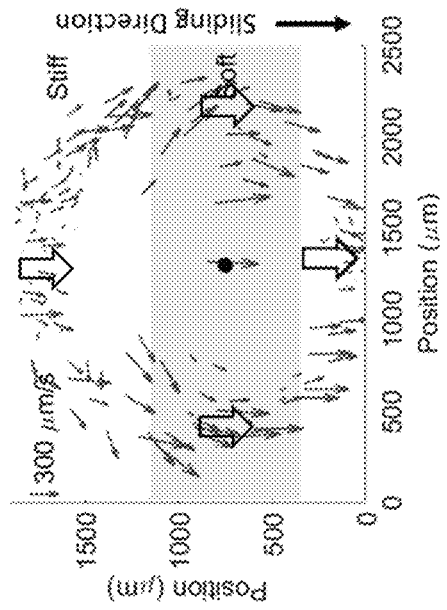
Figure 10D:
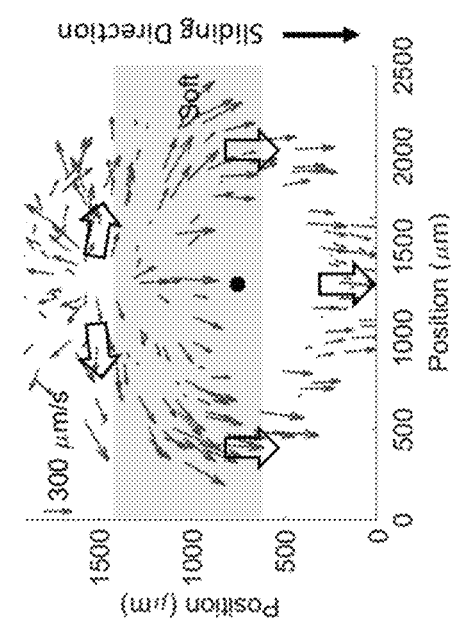
Figure 10E:
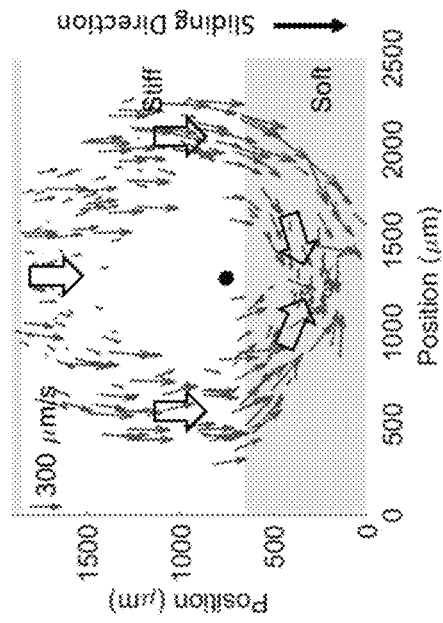

The MPM samples are not translationally invariant so their velocity fields did not exhibit steady state behavior. FIGS. 10A-10E present still images from video detailing the instantaneous velocity field during sliding over one period of the structure. These still images are from an experiment with an intermediate normal load of 113.3 mN. The yellow area represents the smaller modulus phase (soft), the area with no shading the larger modulus phase (stiff), and the black dot represents the lowest point of the indenter, i.e., roughly the center of the contact region. The flow behavior in FIGS. 10A-10E have been matched to their respective locations on the force vs position plot in FIG. 5 to aid in understanding the relationship between periodic features of the force response and the instantaneous flow field. At $t_1$=0s, FIG. 10A shows a velocity profile similar to that in FIG. 9A for M2, as the center point of contact is near the center of the stiff phase. This corresponds to a plateau region on the curve in FIG. 5, where the force is slowly decreasing. At $t_2$=1s in FIG. 10B, as the smaller modulus area of the structure approaches the center point of the indenter, particles approaching the indenter begin to move rapidly both in-line and perpendicular to the sliding direction (i.e., approximately radially), with the radial flow becoming more severe at $t_3=1.3s$ as shown in FIG. 10C. FIGS. 10B and 10C correspond to a rapidly decreasing force to its minimum value, FIG. 5. The radial expulsion of particles eventually leads to a much larger contact region devoid of particles, as shown in FIG. 10D at $t_4=2s$, indicating an increase in the effective contact region. This corresponds to an increasing force in FIG. 5. At $t_5=3s$, as the soft phase passes the center point of the indenter, this contact region rapidly decreases in size as particles flow inward, as shown in FIG. 10E. This corresponds to the point right after the force peak, where the force suddenly decreases rapidly in FIG. 5. At t=4s, the center point has traveled one period of MPM, and the position and flow behavior returns to what was shown in FIG. 10A; the cycle repeats.

This observation of periodic unsteady velocity fields with accompanying changes in the contact region indicates that the sudden local transition in compliance provides a mechanism for unstable deformation and dissipation of energy, a new form of Elastic Hysteresis. In other words, the energy lost through the process of cyclic indentation of the surface as the modulus changes is a major mechanism behind the observed friction enhancement. Based on the observation of sudden rapid and periodic radial fluid flow in the contact region, it appears that this energy is being dissipated through the fluid.

Having thus described a few particular embodiments of the invention and an example including comparative examples, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An article of manufacture comprising:
a body at least a portion of which is a multi-phase material (MPM) defining a traction surface;
said MPM comprising at least first and second zones comprising first and second materials, M1, M2, respectively, at or near said traction surface, said M1 and M2 having first and second Young moduli respectively, said first and second moduli differing by at least a factor of 3, wherein said first modulus is greater than said second modulus, and wherein said at least first and second zones comprise said second zones disposed as islands within a matrix of said M1, wherein x and y represent the fraction of surface area of said traction surface occupied by said M1 and M2, respectively, and wherein each of said MPM, M1, and M2 has a sliding friction, $f_{MPM}$, $f_{M1}$, $f_{M2}$, wherein the sliding frictions correspond to an enhancement ratio $$Enh.R. = \frac{f_{MPM}}{x*f_{M1} + y*f_{M2}},$$

wherein Enh.R>1; and
wherein each of said second zones has a center, and wherein said second zones have a center-to-center radial distribution function having a peak at between 10 μm and 1 mm.

2. The article of claim 1, wherein said first and second moduli differ by at least a factor of 4.
3. The article of claim 2, wherein said first and second moduli differ by at least a factor of 10.
4. The article of claim 3, wherein said first and second moduli differ by a factor of 10 to 50.
5. The article of claim 1, wherein said first modulus is about 1 kPa to about 100 MPa, and said second modulus is about 300 Pa to about 30 MPa.
6. The article of claim 1, wherein said first and second zones comprise one or more additional zones comprising one or more different materials having Young's moduli differing from said first and second moduli.
7. The article of claim 1, said traction surface comprises a thin layer over said M1 and M2.
8. The article of claim 7, wherein said thin layer comprises said M2, wherein said second modulus is less than said first modulus.
9. The article of claim 1, wherein Enh.R>1.5.
10. The article of claim 1, wherein Enh.R>2.0.
11. The article of claim 1, wherein x is greater than y.
12. The article of claim 1, wherein x about the same as y.
13. The article of claim 1, wherein said traction surface is planar.
14. The article of claim 1, wherein said article is a tire.
15. The article of claim 1, wherein said article also comprises one or more additional materials to enhance tire performance.
16. A method of preparing a multi-phase material (MPM) having a traction surface, said method comprising:
combining at least a first material M1 with a second material M2 to form at least first and second zones, respectively, at or near said traction surface, said M1 and M2 having first and second Young moduli respectively, said first and second moduli differing by at least a factor of 3, wherein said first modulus is greater than said second modulus, and wherein said at least first and second zones comprise said second zones disposed as islands within a matrix of said M1, wherein x and y represent the fraction of surface area of said traction surface occupied by said M1 and M2, respectively, and wherein each of said MPM, M1, and M2 has a sliding friction, $f_{MPM}$, $f_{M1}$, $f_{M2}$, wherein the sliding frictions correspond to an enhancement ratio $$Enh.R. = \frac{f_{MPM}}{x*f_{M1} + y*f_{M2}},$$

wherein Enh.R>1; and
wherein each of said second zones has a center, and wherein said second zones have a center-to-center radial distribution function having a peak at between 1 μm and 10 mm.
17. The method of claim 16, wherein said combining comprises mixing crumbs of M2 into a fluid volume of M1.
18. The method of claim 16, wherein said first modulus is about 1 kPa to about 100 MPa, and said second modulus is about 300 Pa to about 30 MPa.
19. The method of claim 16, wherein Enh.R>1.5.
20. The method of claim 16, wherein Enh.R>2.0.
21. The method of claim 16, wherein x is greater than y.
22. The method of claim 16, wherein x about the same as y.

* * * * *